(12) United States Patent
Issari et al.

(10) Patent No.: US 8,119,746 B2
(45) Date of Patent: Feb. 21, 2012

(54) POLYSILOXANES GRAFTED WITH RADICALLY CURABLE AND/OR MOISTURE CURABLE GROUPS

(75) Inventors: Bahram Issari, Glastonbury, CT (US); Michael P. Levandoski, Bristol, CT (US); Richard Corrao, Manchester, CT (US); Hsien-Kun Chu, Wethersfield, CT (US); Robert P. Cross, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 488 days.

(21) Appl. No.: 12/323,524

(22) Filed: Nov. 26, 2008

(65) Prior Publication Data
US 2009/0143554 A1 Jun. 4, 2009

Related U.S. Application Data

(60) Provisional application No. 60/991,320, filed on Nov. 30, 2007.

(51) Int. Cl.
*C08F 130/08* (2006.01)

(52) U.S. Cl. ............................................ 526/89; 528/31
(58) Field of Classification Search .................... 526/89; 528/31
See application file for complete search history.

(56) References Cited

U.S. PATENT DOCUMENTS

| 3,281,389 A | * | 10/1966 | Hirshfield | ..................... 524/525 |
| 4,111,890 A | | 9/1978 | Getson et al. | |
| 4,528,081 A | | 7/1985 | Lien et al. | |
| 4,699,802 A | | 10/1987 | Nakos et al. | |
| 5,276,087 A | * | 1/1994 | Fujiki et al. | ................... 524/786 |

OTHER PUBLICATIONS

Mark (Encyclopedia of Polymer Science and Engineering, vol. 2, Wiley-Interscience, 1985, pp. 550-552, 562-567 and 574-576).*

* cited by examiner

*Primary Examiner* — Kuo-Liang Peng
(74) *Attorney, Agent, or Firm* — Steven C. Bauman

(57) ABSTRACT

This application relates to polysiloxane compositions grafted with improved heat curable, moisture curable, or heat/moisture curable groups. In particular, the polysiloxane compositions have reactive groups on the terminal or pendent areas of the siloxane backbone, which once reacted provide improved heat and/or moisture curable polysiloxanes.

3 Claims, 1 Drawing Sheet

POLYSILOXANES GRAFTED WITH RADICALLY CURABLE AND/OR MOISTURE CURABLE GROUPS

RELATED APPLICATION DATA

This application claims a priority filing date under 35 U.S.C. §119(e) from U.S. Provisional Application No. 60/991,320, filed Nov. 30, 2007, the disclosure of which is hereby expressly incorporated herein by reference.

BACKGROUND OF THE INVENTION

1. Field of the Invention

This application relates to polysiloxane compositions grafted with improved heat curable, moisture curable, or heat/moisture curable groups. In particular, the polysiloxane compositions have reactive groups on the terminal or pendent areas of the siloxane backbone, which once reacted provide improved heat and/or moisture curable polysiloxanes.

2. Brief Description of the Related Technology

Moisture-curing mechanisms, heat-curing mechanisms, and light-curing mechanisms are among the means used to initiate cure, i.e., cross-linking, of reactive compositions, such as reactive silicones. These mechanisms are based on either condensation reactions, whereby moisture hydrolyzes certain groups, or addition reactions that can be initiated by a form of energy, such as electromagnetic radiation or heat. In certain compositions, a combination of such cure mechanisms may be used to achieve the desired results.

For example, reactive polyorganosiloxanes can be cured in the presence or absence of heat in the presence of a peroxide. Alternatively, these reactive siloxanes can also be cured in the presence or absence of heat in the presence of silicone hydride-containing (—SiH) compounds and a metallic hydrosilylation catalyst, such as an organo-platinum catalyst.

Dual curing silicone compositions are also known. However, generally, these dual-curing compositions have been limited to compositions that are both light-curing and moisture-curing. See U.S. Pat. Nos. 4,528,081 (Nakos) and U.S. Pat. Nos. 4,699,802 (Nakos), the disclosures of each of which are hereby incorporated herein by reference.

Notwithstanding the state of the technology, it would be desirable to provide a curable composition, where the composition would be curable in the presence of heat and/or moisture, as well as heat and/or light, or moisture and/or light, which demonstrates commercially acceptable tack free time upon curing.

SUMMARY OF THE INVENTION

In one aspect of the invention, there is provided a curable composition having at least one component, which has the structure:

In this aspect of the invention, A is a hydrocarbon or heterohydrocarbon backbone having at least one pendent vinyl group or a siloxane backbone having at least one vinyl, alkoxy or hydride pendent group. $R^1$ and $R^2$ may be the same or different and are each independently either a vinyl-containing group, an alkoxy-containing group, an alkyl-containing group, a (meth)acryloxy-containing group or a hydride-containing group, provided that (i) when A is a hydrocarbon or heterocarbon backbone, having at least one pendent vinyl group, $R^1$ and $R^2$ are alkyl groups; (ii) when A is a siloxane backbone, having at least one pendent vinyl group, $R^1$ and $R^2$ are either vinyl, alkoxyl or alkyl groups; and (iii) when A is a siloxane backbone, having at least one pendent hydride group, $R^1$ and $R^2$ are either a hydride-containing, alkyl-containing, alkoxy-containing, or (meth)acryloxy-containing groups.

In another aspect of the invention, there is provided a curable composition having at least one component, which has the structure:

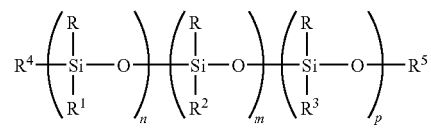

In this aspect, R in each occurrence may be the same or may be different and is has 1 to 4 carbons. $R^1$ is a substituted or unsubstituted alkylenylsiloxy group, a substituted or unsubstituted alkylenyl(meth)acryloxy group, a substituted or unsubstituted alkylenylenoxy group, a substituted or unsubstituted alkylenyloximino group, or a substituted or unsubstituted alkylenylacetoxy group. $R^2$ is a (meth)acryloxy group. $R^3$ is an unsaturated group. $R^4$ and $R^5$ may be the same or may be different and may independently be any of the groups of R, $R^1$, $R^2$ or $R^3$. n is any integer from 1 to 12,000, m is any integer from about 1 to about 20, and p is any integer from about 0 to about 20.

In another aspect of the invention, there is provided a curable composition having a first component, which has a siloxane polymeric backbone having at least one vinyl group terminating at the end and at least two pendent groups off the polymeric backbone. At least one of the pendent groups is a moisture-curing group, and at least one of the pendent groups has the structure:

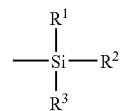

In this aspect of the invention, $R^1$, $R^2$ and $R^3$ may be the same or may be different, and may independently be a vinyl containing group, an alkoxy-containing group, an alkyl-containing group, an acryloxy-containing group or a hydride-containing group.

In a further aspect of the invention, there is provided a method of preparing a curable composition, which includes the steps of reacting a first component, which has the structure:

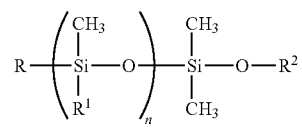

with a second component, which has the structure:

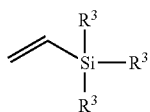

to form a curable composition, which has the structure:

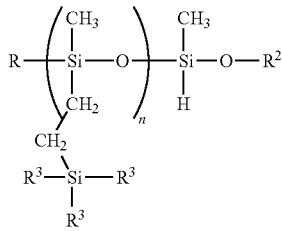

In this aspect of the invention, R, $R^2$, and $R^3$ may be the same or may be different, and may independently be a vinyl containing group, an alkoxy-containing group, an alkyl-containing group, an acryloxy-containing group and a hydride-containing group. $R^1$ is a hydride-containing group. n is an integer from 1 to about 20.

In yet another aspect of the invention there is provided a method of preparing a curable composition, which includes the steps of reacting a first component having the structure:

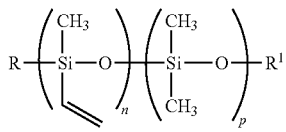

with a second component having the structure:

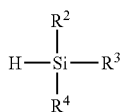

to form a curable composition having the structure:

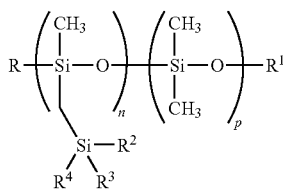

In this aspect of the invention, R and $R^1$ may be the same or may be different, and may independently be an alkyl-substituted silane group, an alkyl-containing group, or an alkoxy-containing group. $R^2$, $R^3$, and $R^4$ may be the same or may be different, and may independently be a vinyl containing group, an alkoxy-containing group, an alkyl-containing group, an acryloxy-containing group or a hydride-containing group. Further, in this aspect of the invention, n is an integer from 1 to about 20, and p is an integer from 1 to about 100,000.

In another aspect of the invention, there is provided a method of preparing a curable composition which includes the steps of reacting a first component having the structure:

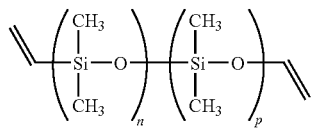

with a second component having the structure:

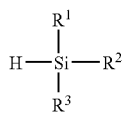

to form a curable composition, which has the structure:

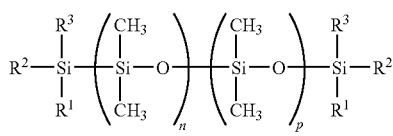

In this aspect of the invention, $R^1$, $R^2$, and $R^3$ may be the same or may be different, and may independently be a vinyl containing group, an alkoxy-containing group, an alkyl-containing group, an acryloxy-containing group or a hydride-containing group. n is an integer from 1 to about 10,000, and p is an integer from 1 to about 10,000.

In yet another aspect of the invention there is provided a method of preparing a curable composition which includes the steps of reacting a first component including the structure:

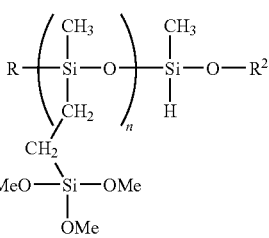

with a hydroxyalkylmethacrylate to form a curable composition having the structure:

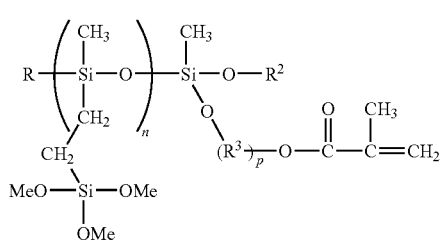

In this aspect of the invention, R and $R^2$ may be the same or may be different, and may independently be a vinyl containing group, an alkoxy-containing group, an alkyl-containing group, an acryloxy-containing group or a hydride-containing group. $R^3$ is an alkylenyl group. Finally, n is an integer from 1 to about 20, and p is an integer from 1 to 4.

DETAILED DESCRIPTION OF THE INVENTION

Figure 1:
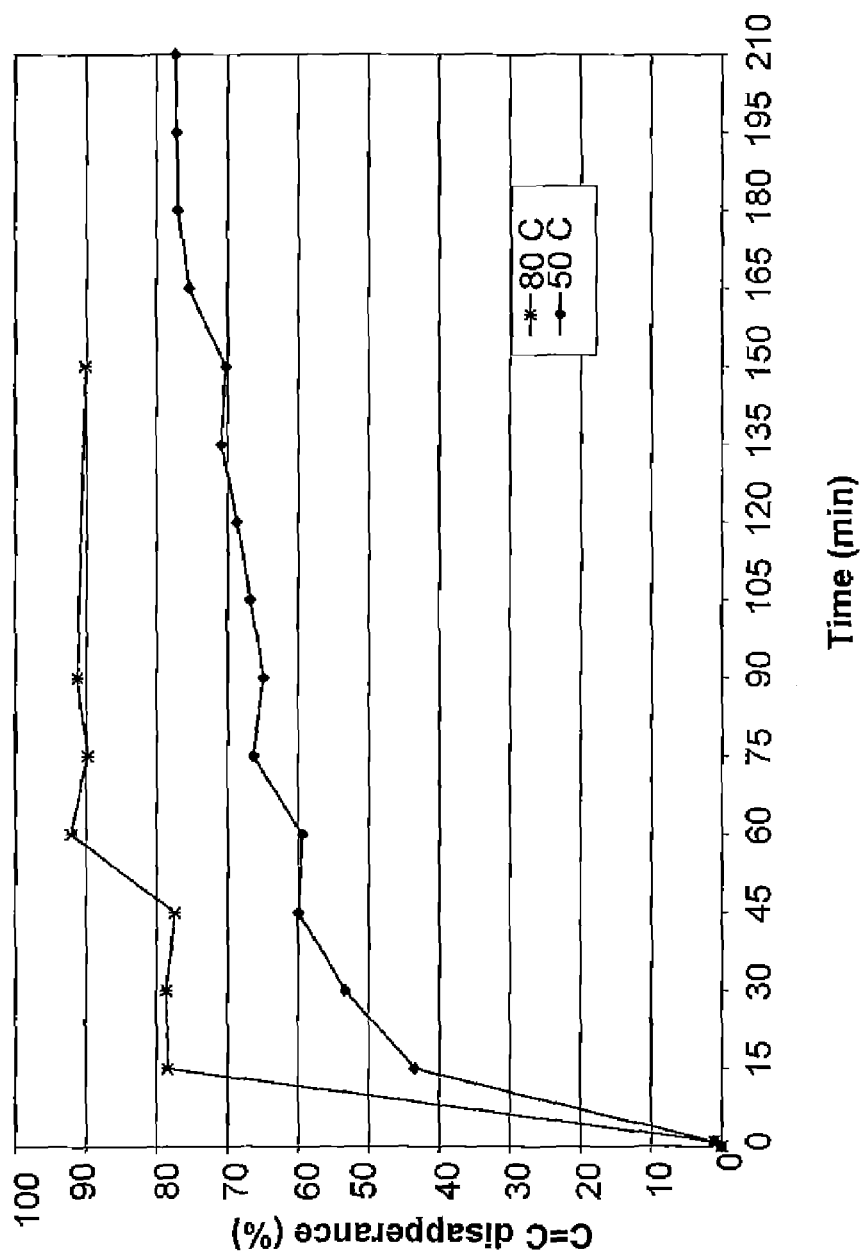
FIG. 1 is a graphic depiction of the curability of a composition within the scope of the present invention (Example 1) at temperatures of 50° C. and 80° C.

Generally, the curable component has a backbone that may be based on silicone, urethene, polyalkylene, polyalkylene oxide, and combinations thereof, and pendant and/or terminating therefrom are reactive groups, desirably groups that will react to provide a heat-curable and/or moisture-curable group.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

In a desirable aspect of the invention, the compositions are silicone-based, functionalized with at least one group selected from vinyl, alkoxy, alkyl, (meth)acryloxy, or hydride groups. While the invention is not limited to such types of materials, for the sake of convenience the invention will be described for the most part in these terms.

As used herein, the term "(meth)acrylate" is intended to refer to groups of the structure

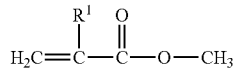

where $R^1$ is H or alkyl. Acrylate, methacrylate and ethacrylate groups are merely a few examples of such (meth)acrylate groups.

As used herein, the terms "alkoxy group" and "aryloxy group" are intended to refer to groups of the structure, R—O, where R is alkyl or aryl, non-limiting examples of which include methoxy, ethoxy and phenoxy.

Curable Compositions

In one aspect of the invention, the curable composition provides a component of structure (I):

$$R^1\text{-}A\text{-}R^2 \quad \text{(I)}$$

where A is the backbone, and is either a hydrocarbon or heterohydrocarbon backbone having at least one pendent vinyl group, or is a siloxane backbone having at least one vinyl, alkoxy or hydride pendent group (depicted as $R^1$ and $R^2$).

In this aspect of the invention, $R^1$ and $R^2$ may either be the same or they may be different. They are independently selected from groups including a vinyl-containing group, an alkoxy-containing group, an alkyl-containing group, a (meth) acryloxy-containing group, and a hydride-containing group. The selection of the $R^1$ and $R^2$ groups may be limited, however. When A is a hydrocarbon or heterocarbon backbone having at lest one pendent vinyl group, $R^1$ and $R^2$ are desirably alkyl groups. When A is a siloxane backbone, having at least one pendent vinyl-containing group, then $R^1$ and $R^2$ are desirably a vinyl-containing group, an alkoxyl-containing group, or an alkyl-containing group. When A is a siloxane backbone, having at least one pendent hydride group, $R^1$ and $R^2$ are desirably a hydride-containing group, an alkyl-containing group, an alkoxy-containing group or a (meth)acryloxy-containing group.

In an alternative aspect of the invention, the curable composition may further include a catalyst. The catalyst is desirably a moisture cure catalyst, a heat cure catalyst, a light cure catalyst, and combinations of the various catalysts. In some embodiments, a peroxide can be a heat catalyst. In other embodiments, a hydrosilation catalyst may be effective in the presence of heat or at room temperature. In other embodiments, a metal catalyst, such as cobalt naphtenate, may be incorporated to polymerize the vinyl groups of the composition through interaction with atmospheric oxygen. In other embodiments, there may be anaerobic curing via a peroxide catalyst in the absence of oxygen.

In another aspect of the invention, there is provided an alternative curable composition. In this aspect of the invention, the curable composition provides a component of structure (II):

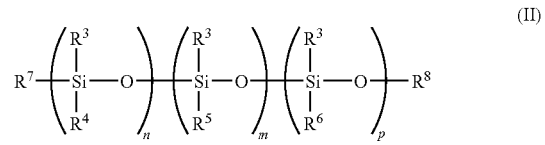

where $R^3$ may be the same or may be different in each occurrence, and includes alkyl groups having from 1 to about 4 carbons. $R^4$ may be a substituted or unsubstituted alkylenylsiloxy group, a substituted or unsubstituted alkylenyl(meth) acryloxy group, a substituted or unsubstituted alkylenylenoxy group, a substituted or unsubstituted alkylenyloximino group, or a substituted or unsubstituted alkylenylacetoxy group. $R^5$ is desirably a (meth)acryloxy group. $R^6$ is desirably an unsaturated group. $R^7$ and $R^8$ may be the same or they may be different, and they are independently any of the groups of $R^3$, $R^4$, $R^5$ and $R^6$. n is an integer from 1 to about 12,000. m is an integer from 1 to about 20, and p is an integer from about 0 to about 20. In one desirable aspect of the invention, $R^6$ is a vinyl-containing group.

The present invention also provides a curable composition, which allows for moisture and/or heat curing. The composition includes a first component, which is a siloxane polymeric backbone having at least one vinyl group terminating at the end, and at least two pendent groups off of the polymeric backbone. Desirably, at least one of the pendent groups is a moisture-curing group, and at least one of the other pendent groups includes the structure:

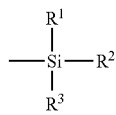

$R^1$, $R^2$ and $R^3$ may be the same or may be different. They may independently include a vinyl containing group, an alkoxy-containing group, an alkyl-containing group, an acryloxy-containing group and a hydride-containing group.

A non-limiting example of the curable component of the curable composition has the following structure:

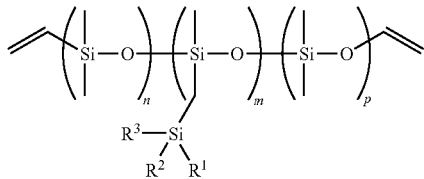

In this structure, n is an integer from 1 to about 12,000, m may be an integer from 1 to about 20, and p may be an integer from 1 to about 20. However, the siloxane-vinyl containing group may be spaced randomly along the backbone of the structure, which may change the respective values of n and p.

Methods of Producing Curable Compositions

The present invention further provides various methods of producing curable compositions. The curable compositions prepared by the present invention allow for improved curing, either by moisture, heat, light, or combinations thereof.

In one aspect of the invention, there is provided a method of preparing a curable composition. First, there is provided a first component having the structure (I-A):

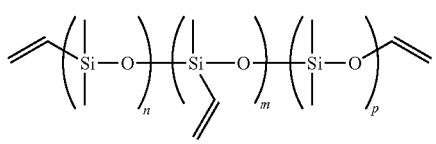

(I-A)

where n is an integer from 1 to about 12,000, m may be an integer from 1 to about 20, and p may be an integer from 1 to about 20. However, the siloxane-vinyl containing group may be spaced randomly along the backbone of the structure, which may change the values of n and p. In an alternate aspect of the invention, the side groups on the chain may include methoxy groups.

This first component (I-A) may either be manufactured by the user or obtained directly. In one aspect of the invention, the first component (I-A) may be manufactured by combining a structure (I-a):

HO—PDMS—OH    (I-a)

with vinyl-trimethylsiloxane, to result in the first component (IA), set forth above. PDMS refers to polydimethylsiloxane.

The first component (IA) may then be combined with a hydride, having the structure (II-A):

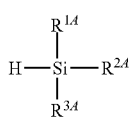

(II-A)

where $R^{1A}$, $R^{2A}$ and $R^{3A}$ may be the same or they may be different. $R^{1A}$, $R^{2A}$ and $R^{3A}$ are each independently a vinyl-containing group, an alkoxy-containing group, an alkyl-containing group, an acryloxy-containing group or a hydride-containing group.

The resulting composition has the structure (III-A):

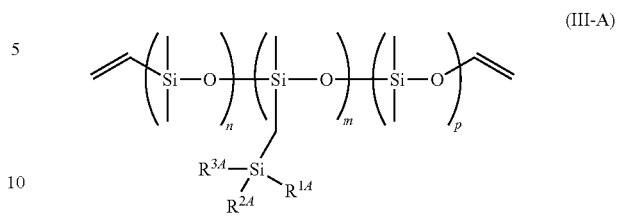

(III-A)

where $R^{1A}$, $R^{2A}$ and $R^{3A}$ may be the same or they may be different. $R^{1A}$, $R^{2A}$ and $R^{3A}$ are each independently a vinyl-containing group, an alkoxy-containing group, an alkyl-containing group, an acryloxy-containing group or a hydride-containing group. Additionally n is an integer from 1 to about 12,000, m may be an integer from 1 to about 20, and p may be an integer from 1 to about 20. However, the siloxane-vinyl containing group may be spaced randomly along the backbone of the structure, which may change the values of n and p.

In a desired aspect of the invention, the hydride (II-A) is combined with the first composition (I-A) in an amount that is insufficient to react fully with all available vinyl groups on the first composition (I-A). In an alternative aspect of the invention, the hydride may be added in a molar equivalent or higher, which will react with the side vinyl groups on the first composition (I-A), and further leave unreacted hydride monomers in the mixture.

In another aspect of the invention, there is a method of preparing a curable composition. There is provided a first component having the structure (I-B):

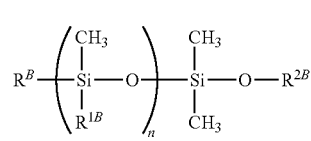

(I-B)

where $R^{B}$, $R^{1B}$ and $R^{2B}$ may be the same or they may be different. $R^{B}$, $R^{1B}$, and $R^{2B}$ may each independently include a vinyl-containing group, an alkoxy-containing group, an alkyl-containing group, an acryloxy-containing group and a hydride containing group. n may be any integer from 1 to about 20. In a desired aspect of the invention, $R^{1B}$ is a hydride-containing group.

In an alternate aspect of the invention, $R^{1B}$ may be a hydride-containing group, and may be located anywhere on the backbone, including at one end as represented in (I-B). $R^{1B}$ may alternatively include any structure that has at least one double bond and a moisture labile group on the silicone.

The first composition (I-B) may be reacted with a second component having the structure (II-B):

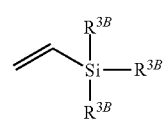

(II-B)

where $R^{3B}$ is desirably an alkoxy-containing group.

The resulting composition includes the structure (III-B):

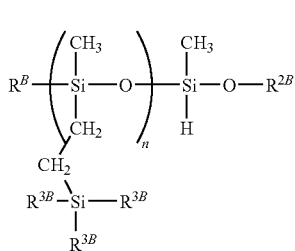
(III-B)

where $R^B$, $R^{1B}$ and $R^{2B}$ may be the same or they may be different. $R^B$, $R^{1B}$, and $R^{2B}$ may each independently include a vinyl-containing group, an alkoxy-containing group, an alkyl-containing group, an acryloxy-containing group or a hydride containing group. $R^{3B}$ is desirably an alkoxy-containing group. n may be any integer from 1 to about 20. In a desired aspect of the invention, $R^{1B}$ is a hydride-containing group.

In an alternate aspect of the invention, $R^{1B}$ may be a hydride-containing group, and may be located anywhere on the backbone, including at one end as represented in (I-B). $R^{1B}$ may alternatively include any structure that has at least one double bond and a moisture labile group on the silicone.

In an alternative aspect of the invention, the second component (II-B) may be combined at a lower molar amount than the first component (I-B), to limit the reactivity of the components.

In another aspect of the invention, there is a method of preparing a curable composition. In this aspect of the invention, there is provided a first component having the structure (I-C):

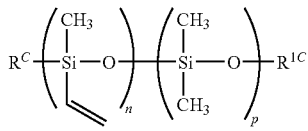
(I-C)

where $R^C$ and $R^{1C}$ are desirably substituted silanes. Desirably, $R^C$ and $R^{1C}$ are trimethyl substituted silanes. p is an integer from 1 to about 100,000. n may be an integer from 1 to about 20. In an alternate aspect of the invention, n may be dispersed throughout the backbone of the polymer chain.

The first component (I-C) may then be reacted with a second component having the structure (II-C):

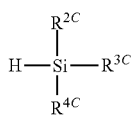
(II-C)

where $R^{2C}$, $R^{3C}$, and $R^{4C}$ may be the same or may be different. $R^{2C}$, $R^{3C}$, and $R^{4C}$ may each independently be a vinyl-containing group, an alkoxy-containing group, an alkyl-containing group, an acryloxy-containing group, or a hydride-containing group.

The resulting curable composition has the structure (III-C):

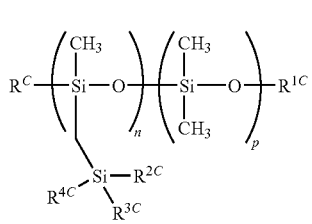
(III-C)

where $R^C$ and $R^{1C}$ are desirably substituted silanes. Desirably, $R^C$ and $R^{1C}$ are trimethyl substituted silanes. $R^{2C}$, $R^{3C}$, and $R^{4C}$ may be the same or may be different. $R^{2C}$, $R^{3C}$, and $R^{4C}$ may each independently be a vinyl-containing group, an alkoxy-containing group, an alkyl-containing group, an acryloxy-containing group, or a hydride-containing group. p is an integer from 1 to about 100,000. n may be an integer from 1 to about 20. In an alternate aspect of the invention, n may be dispersed throughout the backbone of the polymer chain. In one aspect of the invention, the end groups of (III-C) may be alkyl-containing groups.

In an alternative aspect of the invention, the second component (II-C) may be combined at a lower molar amount than the first component (I-C), to limit the reactivity of the components.

In another aspect of the invention, there is a method of preparing a curable composition. There is provided a first component, which has the structure (I-D):

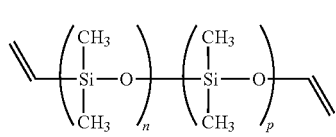
(I-D)

where n is any integer from 1 to about 10,000 and p is an integer from 1 to about 10,000.

The first component (I-D) may then be reacted with a second component having the structure (II-D):

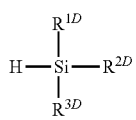
(II-D)

where $R^{1D}$, $R^{2D}$ and $R^{3D}$ may be the same or may be different. They may independently be a vinyl-containing group, an alkoxy-containing group, an alkyl-containing group, an acryloxy-containing group and a hydride-containing group.

The resulting curable composition has the structure (III-D):

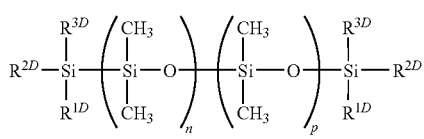
(III-D)

where $R^{1D}$, $R^{2D}$ and $R^{3D}$ may be the same or may be different. They may independently be a vinyl-containing group, an alkoxy-containing group, an alkyl-containing group, an acryloxy-containing group and a hydride-containing group, and where n is an integer from 1 to about 10,000, and where p is an integer from 1 to about 10,000.

In an alternative aspect of the invention, the second component (II-D) may be combined at a lower molar amount than the first component (I-D), to limit the reactivity of the components.

In another aspect of the invention, a method of preparing a curable composition is provided. There is provided a first composition having the structure (I-E):

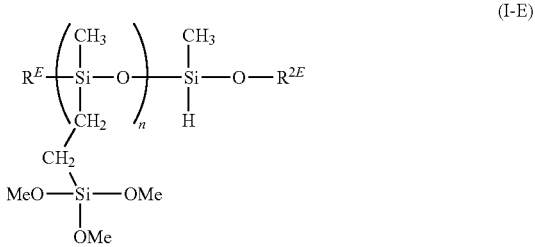
(I-E)

where $R^E$ and $R^{2E}$ may be the same or may be different. $R^E$ and $R^{2E}$ are independently selected from vinyl-containing groups, alkoxy-containing groups, alkyl-containing groups, acryloxy-containing groups and hydride-containing groups. n may be an integer from 1 to about 20. The first composition may be combined with a hydroxyalkylmethacrylate to form a curable composition having the structure (II-E):

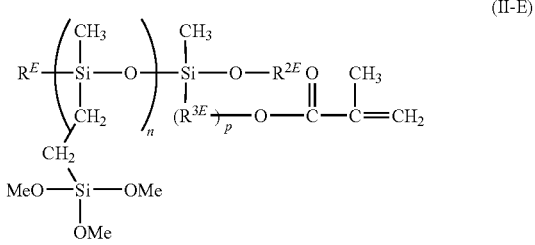
(II-E)

where $R^E$ and $R^{2E}$ may be the same or may be different. $R^E$ and $R^{2E}$ are independently selected from vinyl-containing groups, alkoxy-containing groups, alkyl-containing groups, acryloxy-containing groups and hydride-containing groups. n may be an integer from 1 to about 20. p may be an integer from 1 to 4, and $r^{3E}$ may be an alkylenyl-containing group.

In an aspect of the invention, the hydroxyalkylmethacrylate may have the structure (III-E):

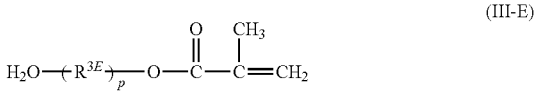
(III-E)

where $R^{3E}$ may be an alkylenyl-containing group and p may be an integer from 1 to 4.

As described above, the polysiloxanes may be optionally grafted with heat curable groups, moisture curable groups, or light curable groups. Non-limiting examples of heat curable groups include alkenes, including vinyl or allyl alkenes, or any double bond entity. In one embodiment, the heat curable groups may include a (meth)acrylate functional group.

Non-limiting examples of moisture curable groups include organic compounds of titanium, tin, zirconium and of course combinations thereof. Illustrative examples of the titanium compounds include tetraisopropyl titanate and tetrabutyl titanate. Illustrative examples of the tin compounds include dibutyltin dilaurate, dibutyltin diacetate, dioctyltindicarboxylate, dimethyltindicarboxylate, and dibutyltindioctoate. Zirconium compounds include zirconium octanoate, and zinc compounds include 2-ethylhexanoate. Additionally, organic amines such as tetramethylguandinamines, diazabicyclo[5.4.0]undec-7-ene (DBU), triethylamine, and the like may be used. See also U.S. Pat. No. 4,111,890, the disclosure of which is expressly incorporated herein by reference.

Non-limiting examples of light curable groups include any photoinitiator known in the art to cure acrylic functionalities, including benzoin and substituted benzoins (such as alkyl ester substituted benzoins), Michler's ketone, dialkoxyacetophenones, such as diethoxyacetophenone ("DEAP"), benzophenone and substituted benzophenones, acetophenone and substituted acetophenones, and xanthone and substituted xanthones. Desirable photoinitiators include DEAP, benzoin methyl ether, benzoin ethyl ether, benzoin isopropyl ether, diethoxyxanthone, chloro-thio-xanthone, azo-bisisobutyronitrile, N-methyl diethanolaminebenzophenone, and mixtures thereof. Visible light initiators include camphoquinone, peroxyester initiators and non-fluorene-carboxylic acid peroxyesters.

Commercially available examples of photoinitiators include those from Vantico, Inc., Brewster, New York under the IRGACURE and DAROCUR tradenames, specifically IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide] and DAROCUR 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and IRGACURE 784DC (bis($\eta^5$-2,4-cyclopentadien-1-yl)-bis[2,6-difluoro-3-(1H-pyrrol-1-yl)phenyl]titanium).

Particularly desirable photoinitiators include DEAP. Generally, the amount of photoinitiator should be in the range of about 0.1% to about 10% by weight, such as about 2 to about 6% by weight.

The polysiloxanes may additionally include flame-retardant components in an amount effective to enhance the resistance of the composition to flammability and combustion. Typically, the flame-retardant component should be present in an amount up to about 70% by weight, with 20-60% by weight being particularly desirable to achieve the desired affect.

Suitable flame-retardant components include hydrated aluminas, precipitated silicas (such as those available commercially under the AEROSIL tradename from Degussa Corporation), hydrated zinc borates (such as those available commercially under the FIREBREAK ZB tradename from Harwick Standard Distribution Corp.), and combinations thereof.

A further component which may optionally be included in the inventive compositions is a reactive diluent, such as (meth)acrylates, for instance those represented by $H_2C=CGCO_2R^6$, where G may be hydrogen, halogen or alkyl of 1 to about 4 carbon atoms, and $R^6$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like. Alternative diluents include, without limitation, vinyl trimethoxysilane; alkyl acetates; hydrocarbon solvents, such as toluene; and acrylamides, such as N,N-dimethyl acrylamide. Other useful additives include plasticizers, fillers such as silica, viscosity modifiers, flow modifiers, pigments, antioxidants, stabilizers, inhibitors, adjuvants, catalysts, accelerators, thixotropic agents, and combinations thereof. These additives should be present in amounts suitable to effectuate their intended purpose.

The compositions of the invention may also include other ingredients to modify the cured or uncured properties as desired for specific applications. For instance, adhesion promoters, such as (meth)acryloxypropyltrimethoxysilane, trialkyl- or triallyl-isocyanurate, glycidoxypropyl trimethoxysilane, vinyl trimethoxysilane and the like, may be incorporated at levels up to about 5 weight percent.

The plasticizers may be present at levels of up to about 30 weight percent. An example of a plasticizer is a non-(meth) acrylated silicone, such as trimethylsilyl-terminated oils of 100-500 csp viscosity and silicone gums. The non-(meth) acrylated silicones may include co-curable groups, such as vinyl groups.

The trimethylsilyl-terminated oils include trimethylsilyl-terminated polydimethylsiloxanes having a viscosity within the range of between about 100 and 5,000 cps.

The physical characteristics of cured reaction products obtained from a given composition will depend in part on the type, identity, amount and molecular weight of the curable component.

The following example is illustrative of the invention.

EXAMPLE

Example 1

30 grams of polydimethylsiloxane with hydride pendant groups was mixed with 30 grams of vinyl trimethoxy silane. The reaction was initiated by the addition of 0.1 grams of a platinum catalyst. The resulting product, cyclotri(vinyl methyl siloxane) was used for the experimental testing.

A Thermo Nicolet Nexus 470 spectrometer with a CIC Photonics Explorer horizontal ATR accessory was used to monitor the disappearance of the C=C bond in the product. The product was placed on an ATR crystal (45° zinc selenide crystal) of a horizontal attenuated total reflectance accessory and a spectrum was taken. The catalyst was then added and another spectrum was taken one minute later. The formulation was then placed in an oven maintained at a temperature of 80° C., and a spectrum was taken every 15 minutes for up to 150 minutes. A separate formulation was placed in an oven maintained at a temperature of 50° C., with the same spectrum being taken every 15 minutes up to 1500 minutes.

For the analysis, a peak area of C=C stretch between 2863 and 2820 $cm^{-1}$ was used as the internal standard. The reaction was monitored by examining the integrated peak area of the C=C in the formulation. The disappearance of the C=C bond was calculated as follows:

% disappearance=$A_0-A_t/A_0$ where $A_0$ is the ratio of the area of the C=C peak and the area of the internal standard peak before the reaction started. At is the ratio of the area of the same two peaks at time t.

The tables below show the results of the spectrum measurements. Table I shows the C=C disappearance % at 80° C., and Table II shows the C=C disappearance % at 50° C. As can be seen, at 80° C., the C=C disappearance reached over 90% after only 60 minutes, while at 50° C., the C=C disappearance reached 75% after 165 minutes, and only reached 81% after 1110 minutes. At 50° C., the maximum disappearance seen was 82% after 1500 minutes.

TABLE I (disappearance % at 80° C.)

| Condition | C=C | Internal Standard (IS) | C=C/IS | % change |
|---|---|---|---|---|
| Before catalyst was added | 0.1073 | 0.771 | 0.13917 | 0 |
| 1 minute after catalyst added | 0.0918 | 0.667 | 0.137631 | 1 |
| 15 mins after catalyst added | 0.0244 | 0.8133 | 0.030001 | 78 |
| 30 mins after catalyst added | 0.01808 | 0.6073 | 0.029771 | 79 |
| 45 mins after catalyst added | 0.034 | 1.079 | 0.031511 | 77 |
| 60 mins after catalyst added | 0.0129 | 1.1806 | 0.010927 | 92 |
| 75 mins after catalyst added | 0.0126 | 0.8911 | 0.01414 | 90 |
| 90 mins after catalyst added | 0.012 | 0.985 | 0.012183 | 91 |
| 150 mins after catalyst added | 0.018 | 1.3023 | 0.013822 | 90 |

TABLE II (disappearance % at 50° C.)

| Condition | C=C | Internal Standard (IS) | C=C/IS | % change |
|---|---|---|---|---|
| Before catalyst was added | 0.1073 | 0.771 | 0.13917 | 0 |
| 1 minute after catalyst added | 0.0918 | 0.667 | 0.137631 | 1 |
| 15 mins after catalyst added | 0.04985 | 0.634 | 0.078628 | 44 |
| 30 mins after catalyst added | 0.0597 | 0.919 | 0.064962 | 53 |
| 45 mins after catalyst added | 0.0444 | 0.795 | 0.055849 | 60 |
| 60 mins after catalyst added | 0.059 | 1.045 | 0.056459 | 59 |
| 75 mins after catalyst added | 0.0636 | 1.358 | 0.046834 | 66 |
| 90 mins after catalyst added | 0.0514 | 1.0521 | 0.048855 | 65 |
| 105 mins after catalyst added | 0.03767 | 0.813 | 0.046335 | 67 |
| 120 mins after catalyst added | 0.0384 | 0.8789 | 0.043691 | 69 |
| 135 mins after catalyst added | 0.0357 | 0.88 | 0.040568 | 71 |
| 150 mins after catalyst added | 0.0393 | 0.9495 | 0.04139 | 70 |
| 165 mins after catalyst added | 0.0436 | 1.274 | 0.034223 | 75 |
| 180 mins after catalyst added | 0.0344 | 1.0764 | 0.031958 | 77 |
| 195 mins after catalyst added | 0.0349 | 1.099 | 0.031756 | 77 |
| 210 mins after catalyst added | 0.0307 | 0.9739 | 0.031523 | 77 |
| 1110 mins after catalyst added | 0.0305 | 1.168 | 0.026113 | 81 |
| 1500 mins after catalyst added | 0.025 | 0.9886 | 0.025288 | 82 |

FIG. 1 shows a graphic comparison of the results obtained at temperatures of 80° C. and at 50° C. As can be seen in the results, the inventive formulation shows a much greater, faster and more complete C=C disappearance at a higher temperature.

The invention claimed is:

1. A curable composition comprising at least one component having the structure:

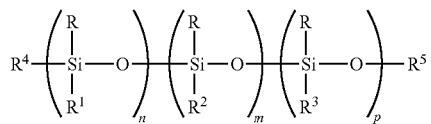

wherein R in each occurrence may be the same or may be different and is selected from alkyl groups having 1 to 4 carbons;

$R^1$ is a substituted or unsubstituted alkylenylsiloxy group, a substituted or unsubstituted alkylenyl(meth)acryloxy group, a substituted or unsubstituted alkylenylenoxy group, a substituted or unsubstituted alkylenyloximino group, or a substituted or unsubstituted alkylenylacetoxy group;

$R^2$ is a (meth)acryloxy group;

$R^3$ is an unsaturated group;

$R^4$ and $R^5$ may be the same or may be different; and may be independently selected from any of the groups of R, $R^1$, $R^2$ or $R^3$;

n is any integer from 1 to 12,000;

m is any integer from about 1 to about 20; and p is any integer from about 0 to about 20.

2. The composition of claim 1, wherein $R^3$ is a vinyl-containing group.

3. The composition of claim 1, wherein said composition further includes a catalyst selected from the group consisting of moisture cure catalysts, heat cure catalysts, light cure catalysts, and mixtures thereof.

* * * * *